United States Patent Office 2,780,053
Patented Feb. 5, 1957

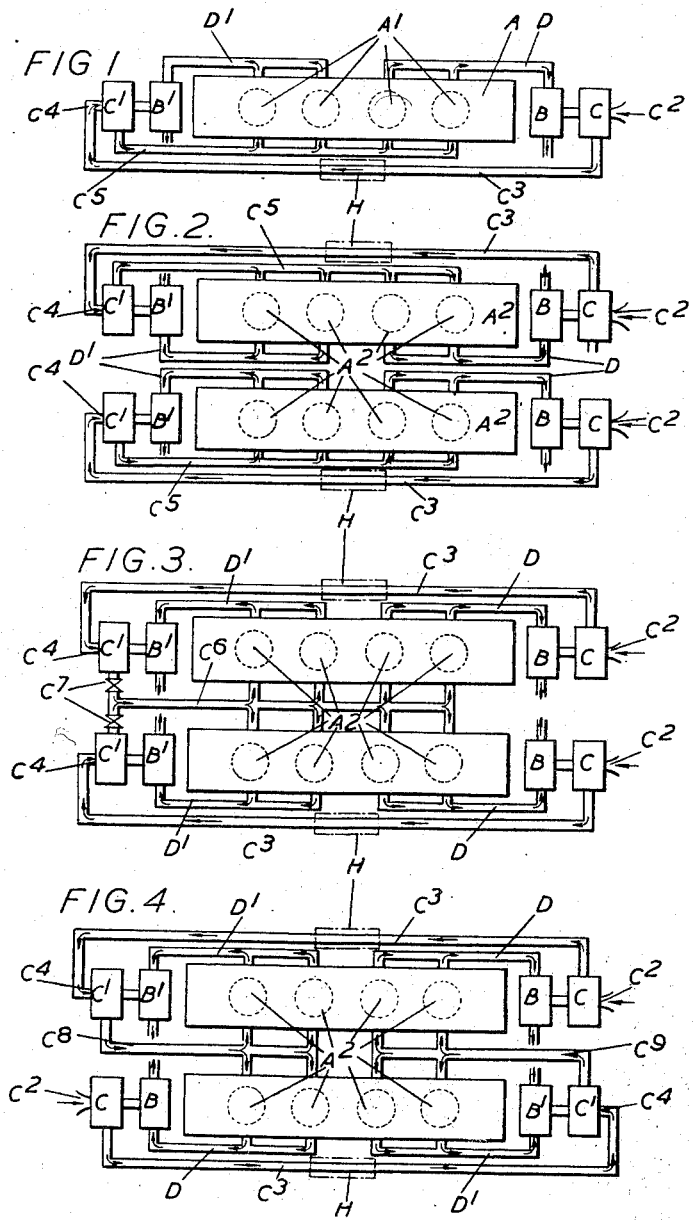

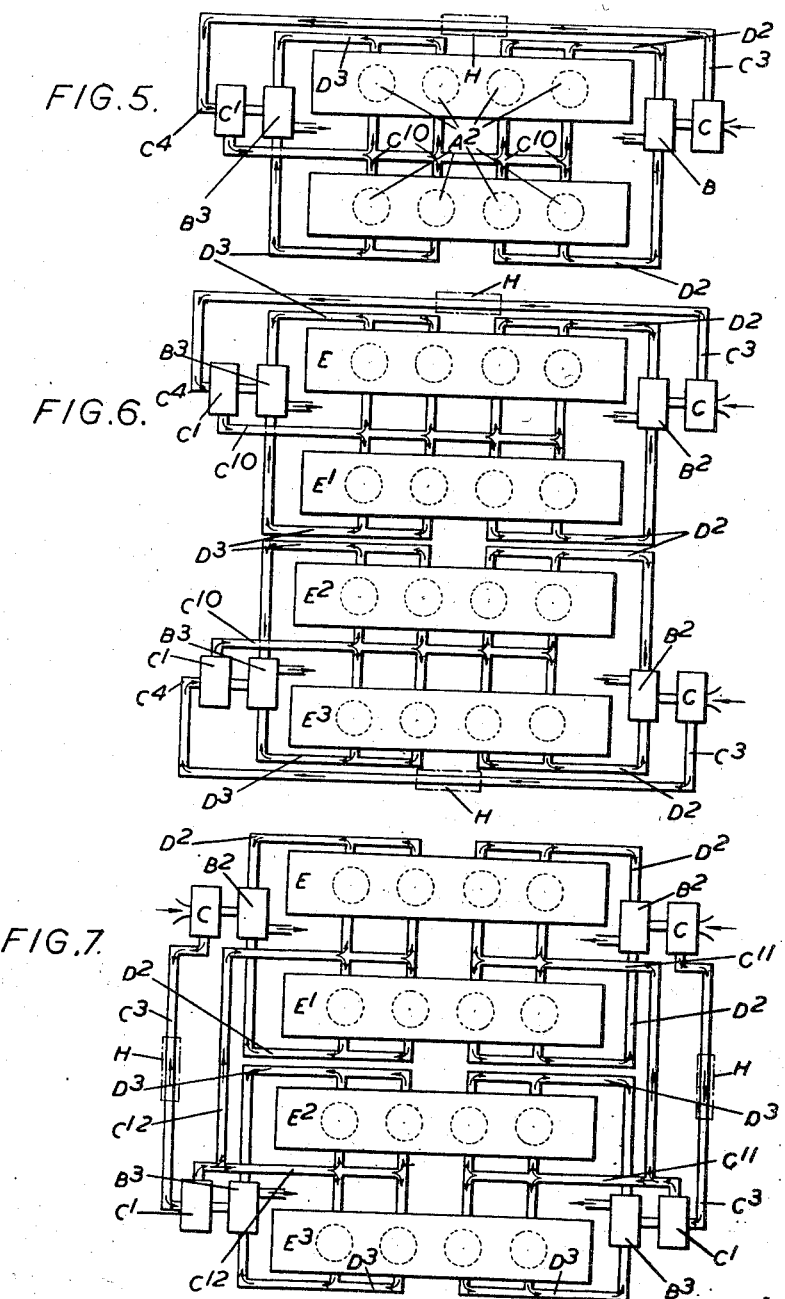

2,780,053

POWER UNITS, INCLUDING RECIPROCATING INTERNAL COMBUSTION ENGINES AND TURBO COMPRESSORS UTILIZING EXHAUST GASES FROM SUCH ENGINES

William Geoffrey Cowland, London, England, assignor to D. Napier & Son Limited, London, England, a company of Great Britain Application December 15, 1952, Serial No. 326,101

Claims priority, application Great Britain December 17, 1951

1 Claim. (Cl. 60—13)

This invention relates to power units of the kind including a reciprocating internal combustion engine the exhaust gases from which are used in one or more turbines driving one or more compressors for delivering the gaseous charge under pressure to the inlet ports of the internal combustion engine for scavenging and/or supercharging purposes, such combination of turbine and compressor usually be called a turbo-blower or turbo-compressor.

A power unit of this kind has been proposed in which the exhaust gases from all the cylinders of the reciprocating internal combustion engine are delivered in parallel to two turbines which respectively drive two compressors disposed adjacent to one another at one end of the engine with the delivery passage of one compressor connected through an intercooler to the inlet passage of the other which has its delivery passage connected to the inlet ports of the internal combustion engine so that the two compressors constitute respectively low and high pressure stages of a supercharging system with the intercooler between them.

An object of the present invention is to provide a power unit of the general kind referred to which will not only enable a comparatively high ratio of compression of the gaseous charge by the turbo-compressor apparatus to be obtained, say a ratio of the order of three-to-one, but will also be convenient as an installation and from a manufacturing point of view and tend to minimize undesirable heat losses.

A power unit according to the present invention comprises a reciprocating internal combustion engine having one or more rows of cylinders extending longitudinally of the crankshaft or crankshafts, at least one turbine disposed adjacent to each end of the internal combustion engine and arranged to be driven by the exhaust gases from cylinders only which lie on the adjacent side of a transverse plane which is normal to the crankshaft axis or axes and is within the length of the cylinder row or rows, and a compressor driven by each of the turbines, the compressors being arranged to form one or more pairs in each of which the delivery passage of one compressor of the pair is connected to the inlet passage of the other compressor of the pair which has its delivery passage connected to inlet ports of the engine so that each pair of compressors forms a two stage compression system with the high pressure stage connected to the engine inlet ports.

Practical embodiments of the invention will vary widely according to the type of internal combustion engine employed and other considerations. The accompanying drawings, however, show diagrammatically various forms which the invention may take when employing various types and arrangements of internal combustion engine.

In the drawings, each of Figures 1 to 7 inclusive constitutes a diagrammatic view in plan of a power unit of the internal combustion type, having the cylinders arranged in one or more rows, and having associated therewith suitable turbo-compressors. It will be appreciated that while these various modifications all embody the principles of the instant invention, they are introduced for the purpose of illustration and are not intended to limit the scope of the invention as defined in the appended claim.

In Figure 1, which illustrates diagrammatically one of the simplest forms of the invention, the internal combustion engine A comprises a single row of cylinders $A^1$ comprising four cylinders and the power unit includes a turbine B and its associated compressor C at one end of the engine and a second turbine $B^1$ and its associated compressor $C^1$ at the opposite end of the engine. The exhaust ports of the two engine cylinders $A^1$ adjacent to the turbine B deliver their exhaust gases through an exhaust passage D to the turbine B while the exhaust ports of the two cylinders $A^1$ adjacent to the turbine $B^1$ deliver their exhaust gases through an exhaust passage $D^1$ to the turbine $B^1$, while the compressor C, which draws air from the atmosphere through its inlet $C^2$, delivers such air through a duct $C^3$ to the inlet $C^4$ of the turbine $C^1$ the outlet of which is connected through a passage $C^5$ to the inlet ports of all four cylinders $A^1$. It will thus be seen that, while the two turbines B and $B^1$ may be regarded as operating in parallel since they each derive their working fluid from a proportion of the cylinders of the engine A, the two compressors C and $C^1$ operate in series and thus effect first-stage and second-stage compression of the whole of the air charge delivered to the cylinders of the engine.

When the internal combustion engine of a power unit according to the invention is of a kind having two or more rows of cylinders, various arrangements may be adopted, and Figures 2 to 7 of the drawings show some of the such arrangements.

In the arrangement shown in Figure 2 the engine comprises two rows of cylinders $A^2$, each comprising four cylinders, and there is associated with each of the rows of cylinders an arrangement of turbines B, $B^1$, first and second-stage compressors C, $C^1$, exhaust passages D, $D^1$ and air delivery passages and ports $C^3$, $C^4$, $C^5$ similar to that employed for the single row of cylinders in the engine shown in Figure 1. Corresponding reference letters to those used in Figure 1 have therefore been applied to the appropriate parts associated with each of the cylinder rows in the arrangement shown in Figure 2 from which this arrangement will be clear without further description.

In the modified arrangement shown in Figure 3 the engine also comprises two rows of cylinders $A^2$ each comprising four cylinders. In this arrangement, however, while the two cylinders at the righthand end of each cylinder row $A^2$ are connected by a passage D to a turbine B driving a first stage compressor C having an air inlet $C^2$ and the two cylinders at the lefthand end of each cylinder row are connected by an exhaust passage $D^1$ to a turbine $B^1$ driving a second stage compressor $C^1$ substantially as in the construction shown in Figure 2, and the delivery passage $C^3$ of each of the first stage compressors C is connected to the inlet $C^4$ of the appropriate second stage compressor $C^1$, the outlets from the two second stage compressors $C^1$ are connected to a common delivery passage $C^6$ by which air is delivered to all the cylinders of the engine. Moreover in this arrangement, if desired, valves $C^7$ may be provided by which the delivery respectively from the two compressors $C^1$ to the passage $C^6$ can be controlled.

Figure 4 shows a modification embodying an engine having two rows $A^2$ of cylinders in which the two cylinders respectively at the righthand end of one cylinder row $A^2$ and at the lefthand end of the other cylinder row $A^2$ are connected by exhaust passages D to turbines B, while the two cylinders at the lefthand end of the first cylinder row and at the righthand end of the second cylinder row are connected by exhaust passages $D^1$ respectively to turbines $B^1$. Each of the turbines B is connected to a first-stage compressor C having an inlet $C^2$ while each of the turbines $B^1$ is connected to a second-stage compressor $C^1$ having an inlet $C^4$. Moreover in this arrangement the delivery passage $C^3$ of each of the first stage compressors C is connected to the inlet port $C^4$ of the second-stage compressor $C^1$ associated with its own cylinder row, while the delivery passage $C^8$ of one of the compressors $C^1$ is connected to the inlet ports of the four cylinders at one end of the engine and the delivery passage $C^9$ of the other compressor $C^1$ is connected to the inlet ports of the four cylinders at the other end of the engine. Thus in this arrangement each of the compressors $C^1$ delivers air to the nearest four cylinders. In a modification of Figure 4 the delivery passage of the compressor C at each end of the engine might be connected to the inlet of the adjacent compressor $C^1$ instead of to that of the compressor $C^1$ at the opposite end of the engine, the arrangement being otherwise as shown.

In the modified form of the invention shown in Figure 5 the engine comprises two cylinder rows $A^2$ each of four cylinders, and the four cylinders at the righthand end of the engine are connected by exhaust passages $D^2$ to a common turbine $B^2$ driving a first-stage compressor C while the four cylinders at the lefthand end of the engine are similarly connected by exhaust passages $D^3$ to a common turbine $B^3$ connected to a second-stage compressor $C^1$, the delivery passage $C^3$ of the first-stage compressor C being connected to the inlet $C^4$ of the second-stage compressor $C^1$ while the delivery passage of the second stage compressor $C^1$ is connected as indicated at $C^{10}$ to the inlet ports of all the cylinders of the engine.

In the form of the invention shown in Figure 6 the engine comprises four rows of cylinders E, $E^1$, $E^2$, $E^3$ each comprising four cylinders. The cylinders at the righthand ends of the cylinder rows E, $E^1$ are connected by exhaust passages $D^2$ to a common turbine $B^2$ driving a first stage compressor C while the four cylinders at the lefthand ends of the cylinders rows E, $E^1$ are connected by exhaust passages $D^3$ to a common turbine $B^3$ driving a second-stage compressor $C^1$, the delivery passage $C^3$ of the first-stage compressor C being connected to the inlet $C^4$ of the second-stage compressor $C^1$ the delivery passage $C^{10}$ of which is connected to the inlet ports of all the cylinders in the rows E, $E^1$. Thus the turbines, compressors and interconnecting passages associated with the cylinder rows E, $E^1$ are arranged similarly to those associated with the two cylinder rows of the engine shown in Figure 5.

The other two rows of cylinders $E^2$, $E^3$ have, in Figure 6, associated therewith turbines and compressors interconnected with each other and the cylinder rows in precisely the same relationship as those associated with the cylinder rows E, $E^1$, and corresponding reference letters have therefore been applied to the various turbines, compressors and passages and the arrangement will not be now further described. It will thus be apparent that the engine shown in Figure 6 may be regarded as divided into two pairs of cylinder rows the cylinder rows in each pair having turbo-compressing apparatus associated therewith in precisely the same manner as the two rows of cylinders constituting the engine in Figure 5.

In the modified arrangement shown in Figure 7 the engine has four rows of cylinders E, $E^1$, $E^2$, $E^3$ as in the arrangement shown in Figure 6. In the arrangement shown in Figure 7, however, the two cylinders at the righthand end of each of the cylinder rows E, $E^1$ are connected by exhaust passages $D^2$ to a common turbine $B^2$ and the two lefthand cylinders of each of the rows E, $E^1$ are similarly connected by exhaust passages $D^2$ to a common turbine $B^2$, while the two cylinders at the righthand end of the cylinder rows $E^2$, $E^3$ are connected by exhaust passages $D^3$ to a common turbine $B^3$ and the four remaining cylinders of the cylinder rows $E^2$, $E^3$ are connected by exhaust passages $D^3$ to a common turbine $B^3$. Each of the turbines $B^2$ drives a first-stage compressor C while each of the turbines $B^3$ drives a second-stage compressor $C^1$, the first-stage compressor C at each end of the engine having its delivery pipe $C^3$ connected to the second-stage compressor at the same end of the engine. The outlet passage of the second stage compressor $C^1$ at the righthand end of the engine is connected by passages $C^{11}$ to the inlet ports of the eight cylinders at the righthand end of the engine, while the outlet of the second-stage compressor $C^1$ at the lefthand end of the engine is connected by passages $C^{12}$ to the inlet ports of the eight cylinders at the lefthand end of the engine.

It will be understood that an intercooler may be provided in the passage or each of the passages $C^3$ between the first-stage compressor C and a second-stage compressor $C^1$ in any of the arrangements described above as indicated at H.

Moreover it will be readily understood that variants of the arrangements actually shown may in some cases be adopted. For example, in an arrangement otherwise similar to that shown in Figure 4 the ducts $C^8$ and $C^9$ may be interconnected and if desired each provided with a controlling valve.

Again, it will be appreciated that in the examples shown engines in which each cylinder row comprises four cylinders have been selected merely for ease and simplicity of illustration and that the invention is applicable to power units incorporating engines with two or more cylinders in each row and whether each cylinder row comprises an odd or even number of cylinders. Moreover in any arrangement according to the invention where the total number of cylinders in the engine permitted and the relationships between the power desired from the two or more exhaust-driven turbines were appropriate, the number of cylinders from which exhaust gas is delivered to one of the turbines may be different from the number of cylinders from which exhaust gas is delivered to the other or another turbine. Where the total number of cylinders in an engine permitted it might also in some cases be desirable to employ more than two first-stage turbine driven compressors and more than two second-stage turbine driven compressors with each second-stage compressor receiving air from the delivery of one of the first-stage compressors. Thus the particular arrangement adopted may in each case be determined by the type and characteristics of the engine, the space available and other considerations.

Since in any case the invention aims at retaining maximum simplicity combined with reasonable manufacturing cost, the compressors will usually be of the centrifugal or centripetal type, while the turbines may be of the single-stage or multi-stage type.

Moreover it will be understood that in some cases a so-called after cooler may be provided between the second stage compressor or each second stage compressor and the cylinders to which it delivers the charge.

What I claim as my invention and desire to secure by Letters Patent is:

A power unit comprising a reciprocating internal combustion engine having two rows of cylinders, a turbo-compressor assembly situated adjacent to each end of each row of cylinders, the turbine of each assembly being arranged to receive exhaust gases only from those cylinders of the row which lie near the adjacent end of the engine, while the other turbine of the row is arranged to receive exhaust gases only from the remaining cylinders in the row, one of the two compressors associated with each row constituting a first stage compressor with its delivery passage connected to the inlet of a second stage compressor situated adjacent to the other end of the same cylinder row, while the delivery passages of the two second stage compressors are both connected to the inlet ports of all the cylinders in the two cylinder rows.

References Cited in the file of this patent

UNITED STATES PATENTS

| | | | |
|---|---|---|---|
| 1,895,538 | Büchi | Jan. 31, | 1933 |
| 1,921,906 | Büchi | Aug. 8, | 1933 |
| 1,938,737 | Büchi | Dec. 12, | 1933 |
| 2,199,259 | Hersey | Apr. 30, | 1940 |
| 2,200,744 | Heinzelmann | May 14, | 1940 |
| 2,245,326 | Büchi | June 10, | 1941 |
| 2,296,268 | Büchi | Sept. 22, | 1942 |
| 2,300,977 | Schlaepfer | Nov. 3, | 1942 |
| 2,306,277 | Oswald | Dec. 22, | 1942 |

FOREIGN PATENTS

| | | | |
|---|---|---|---|
| 182,787 | Great Britain | May 10, | 1923 |
| 160,008 | Switzerland | Apr. 17, | 1933 |